(12) United States Patent
Choi et al.

(10) Patent No.: US 9,255,204 B2
(45) Date of Patent: Feb. 9, 2016

(54) CAVITATION RESISTANT POLYURETHANE COMPOSITIONS AND METHODS OF FORMING COATING FILMS USING THE SAME

(71) Applicants: Jun-Young Choi, Ansan-si (KR); Ja-Min Gu, Anyang-si (KR); Jae-Hak Kim, Gwangmyeong-si (KR)

(72) Inventors: Jun-Young Choi, Ansan-si (KR); Ja-Min Gu, Anyang-si (KR); Jae-Hak Kim, Gwangmyeong-si (KR)

(73) Assignee: NOROO HOLDINGS CO., LTD, Anyang-Si (KR)

(*) Notice: Subject to any disclaimer, the term of this patent is extended or adjusted under 35 U.S.C. 154(b) by 2 days.

(21) Appl. No.: 14/204,291

(22) Filed: Mar. 11, 2014

(65) Prior Publication Data

US 2015/0197641 A1    Jul. 16, 2015

(30) Foreign Application Priority Data

Jan. 16, 2014  (KR) .................. 10-2014-0005392

(51) Int. Cl.

| | | |
|---|---|---|
| C08G 18/22 | (2006.01) | |
| C08G 18/40 | (2006.01) | |
| C08G 18/44 | (2006.01) | |
| C08G 18/48 | (2006.01) | |
| C08G 18/72 | (2006.01) | |
| C08G 18/76 | (2006.01) | |
| C08G 18/79 | (2006.01) | |
| C08K 3/04 | (2006.01) | |
| C09D 5/00 | (2006.01) | |
| C09D 7/12 | (2006.01) | |
| C09D 175/04 | (2006.01) | |
| B82Y 30/00 | (2011.01) | |
| B05D 1/02 | (2006.01) | |
| C08G 18/10 | (2006.01) | |
| C08L 75/06 | (2006.01) | |
| C08L 75/08 | (2006.01) | |
| C08G 18/42 | (2006.01) | |
| C08L 75/04 | (2006.01) | |

(52) U.S. Cl.

CPC .. C09D 5/00 (2013.01); B05D 1/02 (2013.01); B82Y 30/00 (2013.01); C08G 18/10 (2013.01); C08G 18/227 (2013.01); C08G 18/40 (2013.01); C08G 18/4018 (2013.01); C08G 18/4236 (2013.01); C08G 18/4277 (2013.01); C08G 18/44 (2013.01); C08G 18/48 (2013.01); C08G 18/4825 (2013.01); C08G 18/725 (2013.01); C08G 18/7671 (2013.01); C08G 18/797 (2013.01); C08L 75/04 (2013.01); C08L 75/06 (2013.01); C08L 75/08 (2013.01); C09D 7/1266 (2013.01); C09D 175/04 (2013.01); B05D 2202/00 (2013.01); C08K 3/04 (2013.01)

(58) Field of Classification Search

CPC ...... C09D 5/00; C09D 175/04; C09D 7/1266; C08K 3/04; C08K 2003/045; C08K 3/22; C08K 2003/2206; C08K 2003/2227; C08K 3/38; C08K 2003/382; C08K 3/34; C08K 5/36; C08K 5/43; C08L 75/04; C08L 75/06; C08L 75/08; C08G 18/10; C08G 18/4236; C08G 18/4277; C08G 18/40; C08G 18/44; C08G 18/48; C08G 18/4018; C08G 18/227; C08G 18/797; C08G 18/7671; C08G 18/725; C08G 18/4825; B82Y 30/00; B05D 1/02; B05D 2202/00

See application file for complete search history.

(56) References Cited

U.S. PATENT DOCUMENTS

| | | | |
|---|---|---|---|
| 4,463,158 A * | 7/1984 | O'Connor et al. | 528/75 |
| 5,574,102 A * | 11/1996 | Tanigami et al. | 525/124 |
| 2005/0127329 A1* | 6/2005 | Wang | B82Y 10/00 |
| | | | 252/500 |
| 2008/0305266 A1* | 12/2008 | Li et al. | 427/292 |
| 2009/0005492 A1* | 1/2009 | Ikebe et al. | 524/500 |
| 2010/0093926 A1* | 4/2010 | Richards et al. | 524/590 |

OTHER PUBLICATIONS

Junyoung Choi and Sewoong Kim, "Functional Cavitation Resistance Coating System with Organic-inorganic Hybrid", KIC News, vol. 16, No. 5, Oct. 15, 2013, 16 pages including English Abstract.

* cited by examiner

*Primary Examiner* — Patrick Niland

(74) *Attorney, Agent, or Firm* — Daly, Crowley, Mofford & Durkee, LLP

(57) ABSTRACT

A cavitation resistant polyurethane composition includes a first solution comprising a urethane prepolymer and a second solution. The urethane prepolymer is synthesized by a polymerization of about 60 to about 70 weight percent of an isocynate compound and about 30 to about 40 weight percent of a polyol. An average functional group number of the isocyanate compound is at least 2. The second solution includes about 90 to about 95 weight percent of a polyol having an average functional group number of at least 4, about 1 to about 3 weight percent of a nano-carbon, about 1 to about 3 weight percent of a colorant, about 1 to about 3 weight percent of a moisture absorbent, about 1 to about 3 weight percent of an anti-wear agent, and about 1 to about 3 weight percent of a defoaming agent.

12 Claims, No Drawings

CAVITATION RESISTANT POLYURETHANE COMPOSITIONS AND METHODS OF FORMING COATING FILMS USING THE SAME

CROSS-REFERENCE TO RELATED APPLICATION

This application claims priority under 35 USC §119 to Korean Patent Application No. 10-2014-0005392 filed on Jan. 16, 2014 in the Korean Intellectual Property Office (KIPO), the entire disclosure of which is herein incorporated by reference.

BACKGROUND

1. Field

Example embodiments relate to cavitation resistant polyurethane compositions and methods of forming coating films using the same.

2. Description of the Related Art

Components of a vessel such as a propeller or a rudder may be vulnerable to an erosion due to a cavitation. The erosion due to the cavitation may be exacerbated as a size and a speed of the vessel become increased to result in a vessel noise, a deterioration of the rudder, a reduction of a fuel efficiency, etc.

Materials and structures of the propeller and the rudder have been researched in order to prevent the erosion due to the cavitation, however, the propeller and the rudder having a sufficient cavitation resistance have not been developed yet.

Recently, coating compositions having the cavitation resistance have been developed to be applied on the propeller and the rudder. However, the coating composition requires excessive cost and has a formulation of being applied manually with, e.g., a spatula or a large spoon. For example, it may cost more than 2 weeks to form a coating film that has a thickness of a few millimeters (mm) and an area of about 150 m$^2$ using the coating composition.

SUMMARY

Some example embodiments provide a cavitation resistant polyurethane composition having an excellent workability and a cost-efficiency.

Some example embodiments provide a method of forming a coating film using a cavitation resistant polyurethane composition having an excellent workability and a cost-efficiency.

According to some example embodiments, there is provided cavitation resistant polyurethane composition. The cavitation resistant polyurethane composition includes a first solution comprising a urethane prepolymer and a second solution. The urethane prepolymer is synthesized by a polymerization of about 60 weight percent to about 70 weight percent of an isocynate compound and about 30 weight percent to about 40 weight percent of a polyol, based on a total weight of the first solution. An average functional group number of the isocyanate compound is at least 2. The second solution comprises about 90 weight percent to about 95 weight percent of a polyol having an average functional group number of at least 4, about 1 weight percent to about 3 weight percent of a nano-carbon, about 1 weight percent to about 3 weight percent of a colorant, about 1 weight percent to about 3 weight percent of a moisture absorbent, about 1 weight percent to about 3 weight percent of an anti-wear agent, and about 1 weight percent to about 3 weight percent of a defoaming agent, based on a total weight of the second solution. A volume ratio of the first solution and the second solution is about 1:1, a mole ratio of a functional group of the isocyanate compound (NCO) and a functional group of the polyol (OH) in the second solution is between about 1.0:1.0 to about 1.05:1.0.

In example embodiments, a weight average molecular weight of the urethane prepolymer may be in a range of from about 2,000 to about 4,000.

In example embodiments, the isocyanate compound may include 1,6-hexamethylene diisocyanate (HDI), isophorone diisocynate (IPDI), 4,4'-dicyclohexamethylene diisocyanate (H12MDI) or methylene diphenyl isocyanate (MDI). These may be used alone or in a combination thereof.

In example embodiments, the polyol in the first solution may include polyoxyalkylene polyol, polytetramethylene polyol, polyether polyol, polyester polyol, polycarbonate polyol or polycaprolactone polyol. These may be used alone or in a combination thereof.

In example embodiments, the polyol in the second solution may include polycaprolactone polyol.

In example embodiments, the nano-carbon may include graphite, graphite fiber, a carbon nanotube, fullerene and graphene. These may be used alone or in a combination thereof.

In example embodiments, the colorant may include carbon black, anthraquinone, phthalocyanine, benzimidazolone, iron oxide yellow, iron oxide red, manganese pyrophosphate, titanium dioxide (TiO2) or zinc oxide (ZnO). These may be used alone or in a combination thereof.

In example embodiments, the moisture absorbent may include at least one selected from the group consisting of polyether calcium oxide, zeolite, aluminum oxide or p-toluenesulfur isocyanate. These may be used alone or in a combination thereof.

In example embodiments, the anti-wear agent may include born nitride, polyethyelene or molybdenum sulfate. These may be used alone or in a combination thereof.

According to some example embodiments, there is provided a method of forming a coating film. In the method, a polyurethane composition is coated on a metal preform. The polyurethane composition is dried. The polyurethane composition includes a first solution comprising a urethane prepolymer and a second solution. The urethane prepolymer is synthesized by a polymerization of about 60 weight percent to about 70 weight percent of an isocynate compound and about 30 weight percent to about 40 weight percent of a polyol, based on a total weight of the first solution. An average functional group number of the isocyanate compound is at least 2. The second solution comprises about 90 weight percent to about 95 weight percent of a polyol having an average functional group number of at least 4, about 1 weight percent to about 3 weight percent of a nano-carbon, about 1 weight percent to about 3 weight percent of a colorant, about 1 weight percent to about 3 weight percent of a moisture absorbent, about 1 weight percent to about 3 weight percent of an anti-wear agent, and about 1 weight percent to about 3 weight percent of a defoaming agent, based on a total weight of the second solution. A volume ratio of the first solution and the second solution is about 1:1, a mole ratio of a functional group of the isocyanate compound (NCO) and a functional group of the polyol (OH) in the second solution is between about 1.0:1.0 to about 1.05:1.0.

In example embodiments, the polyurethane composition may be coated by a spray machine with a discharging pressure of about 200 bar to about 250 bar.

In example embodiments, the polyurethane composition may be coated at a temperature of about 60° C. to about 70° C.

In example embodiments, the polyurethane composition may be coated using a cartridge air gun at a room temperature.

In example embodiments, the coating file may have a thickness ranging from about 0.5 mm to about 3 mm.

DETAILED DESCRIPTION OF THE EMBODIMENTS

Various exemplary embodiments will be described more fully, in which some exemplary embodiments are shown. The present inventive concept may, however, be embodied in many different forms and should not be construed as limited to the exemplary embodiments set forth herein. Rather, these exemplary embodiments are provided so that this description will be thorough and complete, and will fully convey the scope of the present inventive concept to those skilled in the art.

As used herein, the term "and/or" includes any and all combinations of one or more of the associated listed items.

It will be understood that, although the terms first, second, third etc. may be used herein to describe various elements and/or components, these elements and/or components should not be limited by these terms. These terms are only used to distinguish one element or component from another. Thus, a first element or component discussed below could be termed a second element or component without departing from the teachings of the present inventive concept.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Hereinafter, detailed descriptions on cavitation resistant polyurethane compositions and methods of forming coating films using the same according to example embodiments will be provided.

According to example embodiments, a cavitation resistant polyurethane composition may include a first solution and a second solution.

The first composition may include a urethane prepolymer that may be prepared by a polymerization of an isocyanate compound and a polyol. In example embodiments, an average functional group number of the isocyanate compound may be equal to or greater than about 2.

The second solution may include a polyol having an average functional group number of at least about 4 ranging from about 90 weight percent (wt %) to about 95 wt %, a colorant ranging from about 1 wt % to about 3 wt %, a moisture absorbent ranging from about 1 wt % to about 3 wt %, a nano-carbon ranging from about 1 wt % to about 3 wt %, an anti-wear agent raging from about 1 wt % to about 3 wt % and a defoaming agent raging from about 1 wt % to about 3 wt %. Here, the weight percents of the above ingredients are indicated based on the total weight of the second solution.

In example embodiments, a volume ratio of the first solution and the second solution may be about 1:1. A mole ratio of the functional group of the isocyanate compound and the functional group of the polyol in the second solution may be between about 1.0:1.0 to about 1.05:1.0.

Hereinafter, detailed descriptions on types and functions of the above ingredients will be described.

1. First Solution

The first solution may be a main component of the cavitation resistant polyurethane composition. Physical properties such as durability and wear resistance may be enhanced by the first solution.

In example embodiments, the first solution may include a urethane prepolymer. In one example embodiment, the first solution may substantially consist of the urethane prepolymer.

1.1. Urethane Prepolymer

The urethane prepolymer may be prepared through a polymerization of the isocyanate compound and the polyol.

In example embodiments, the urethane prepolymer having a weight average molecular weight in a range from about 2,000 to about 4,000 may be selected in terms of chemical resistance and productivity.

The isocyanate compound may enhance a durability and a hardness of the polyurethane composition or a coating film formed therefrom. The isocyanate compound may include a functional group represented by $N{=}C{=}O$ (hereinafter, referred to as an NCO functional group). As a weight percent of the NCO functional group becomes increased, the hardness of the coating film may be increased. If the weight percent of the NCO functional group becomes excessively decreased, the hardness of the coating film may also be decreased.

The isocyanate compound may include, for example, 1,6-hexamethylene diisocyanate (HDI), isophorone diisocynate (IPDI), 4,4'-dicyclohexamethylene diisocyanate (H12MDI) or methylene diphenyl isocyanate (MDI). These may be used alone or in a combination thereof. In one example embodiment, MDI may be used as the isocyanate compound.

In example embodiments, a combination of two types of the isocyanate compound may be utilized for the polyurethane composition. For example, the combination may include a monomeric isocyanate and a polymeric isocyanate. The polymeric isocyante may be prepared by a reaction of the monomeric isocyanate and a polyol. The polymeric isocyanate may also be prepared by a modification of the monomeric isocyanate through creating a carboimide bond. In this case, the polymeric isocyanate may be liquefied at a room temperature.

For example, the monomeric isocyanate may include pure MDI, and Cosmonate PH (manufactured by KUMHO MITSUI CHEMICALS Co., KR) may be used as pure MDI. The polymeric isocyanate may include liquid MDI, and Cosmonate LL (manufactured by KUMHO MITSUI CHEMICALS Co., KR) may be used as liquid MDI.

In example embodiments, an average functional group number of the isocyanate compound may be equal to or greater than about 2.

In example embodiments, an amount of the isocyanate compound included in the first solution may range from about 60 wt % to about 70 wt % based on the total weight of the first solution. If the amount of the isocyanate compound is less than about 60 wt %, a viscosity of the polyurethane composition may be excessively increased. If the amount of the isocyanate compound exceeds about 70 wt %, an impact resistance of the polyurethane composition or the coating film formed therefrom may be reduced.

The polyol may include, for example, polyoxyalkylene polyol, polytetramethylene polyol, polyether polyol, polyester polyol, polycarbonate polyol or polycaprolactone polyol. These may be used alone or in a mixture thereof.

In example embodiments, an amount of the polyol included in the first solution may range from about 30 wt % to about 40 wt % based on the total weight of the first solution. If the amount of the polyol is less than about 30 wt %, a curing time or a hardening time of the polyurethane composition may be increased. If the amount of the polyol exceeds about 40 wt %, a viscosity of the polyurethane composition may be excessively increased.

The isocyanate compound and the polyol may be polymerized to prepare the urethane prepolymer including the NCO functional group at a terminal thereof.

2. Second Solution

The second solution may serve as a sub-component of the cavitation resistant polyurethane composition in accordance with example embodiments. Hardening or curing properties of the polyurethane composition may be adjusted by the second solution. The second solution may be mixed and reacted with the first solution so that polyurethane resin may be cured or hardened.

The second solution may include the polyol having an average functional group number of at least about 4, the nano-carbon, the colorant, the moisture absorbent, the anti-wear agent and the defoaming agent. The second solution may further include a lubricant.

In example embodiments, the second solution may include the polyol having an average functional group number of at least about 4 ranging from about 90 wt % to about 95 wt %, the colorant ranging from about 1 wt % to about 3 wt %, the moisture absorbent ranging from about 1 wt % to about 3 wt %, the nano-carbon ranging from about 1 wt % to about 3 wt %, the anti-wear agent raging from about 1 wt % to about 3 wt % and the defoaming agent raging from about 1 wt % to about 3 wt %, based on the total weight of the second solution.

2.1. Polyol Having an Average Functional Group Number of at Least about 4

The second solution may include the polyol having an average functional group number of at least about 4. For example, the polyol in the second solution may include polycaprolactone polyol having the average functional group number of 4. The polyol in the second solution may be reacted with the isocyanate functional group to cure or harden polyurethane resin.

In example embodiments, an amount of the polyol in the second solution may range from about 90 wt % to about 95 wt % based on the total weight of the second solution. If the amount of the polyol in the second solution is less than about 90 wt %, a hardness of the coating film formed from the polyurethane composition may be decreased. If the amount of the polyol in the second solution exceeds about 95 wt %, an elongation of the coating film may be reduced.

2.2. Nano-Carbon

The nano-carbon may be included in the second solution to decelerate an erosion of polyurethane resin.

For example, the nano-carbon may include graphite, a graphite fiber, a carbon nanotube, fullerene or graphene. These may be used alone or in a combination thereof. In one example embodiment, the nano-carbon may include the graphite fiber. In one example embodiment, the nano-carbon may be added into the second solution as a powder formation.

In example embodiments, an amount of the nano-carbon may range from about 1 wt % to about 3 wt %, based on the total amount of the second solution. If the amount of the nano-carbon is less than about 1 wt %, the erosion of the coating film may not be sufficiently decelerated. If the amount of the nano-carbon exceeds about 3 wt %, the viscosity of the polyurethane composition may be increased to result in a poor workability.

2.3. Colorant

The colorant may be added in the second solution to provide the polyurethane composition with a color. The colorant may include an organic or an inorganic pigments.

For example, the colorant may include carbon black, anthraquinone, phthalocyanine, benzimidazolone, iron oxide yellow, iron oxide red, manganese pyrophosphate, titanium dioxide ($TiO_2$) or zinc oxide ($ZnO$). These may be used alone or in a combination thereof.

In example embodiments, an amount of the colorant may range from about 1 wt % to about 3 wt %, based on the total amount of the second solution. If the amount of the colorant is less than about 1 wt %, the coating film may not have a desired color or a uniform color. If the amount of the colorant exceeds about 3 wt %, a moisture resistance of the coating film may be deceased.

2.4. Moisture Absorbent

The moisture absorbent may be added in the second solution to control moisture of the coating film or the polyurethane composition.

For example, the moisture absorbent may include polyether calcium oxide, zeolite, aluminum oxide or p-toluenesulfur isocyanate. These may be used alone or in a combination thereof.

In example embodiments, an amount of the moisture absorbent may range from about 1 wt % to about 3 wt %, based on the total amount of the second solution. If the amount of the moisture absorbent is less than about 1 wt %, a surface of the coating film may have defects due to moisture contained in the polyurethane composition. If the amount of the moisture absorbent exceeds about 3 wt %, a viscosity of polyurethane resin may be increased to cause a poor workability.

2.5. Anti-Wear Agent

The anti-wear agent may be added in the second solution to enhance a wear resistance of the coating film formed from polyurethane resin.

For example, the anti-wear agent may include boron nitride, polyethyelene or molybdenum sulfate. These may be used alone or in a combination thereof.

In example embodiments, an amount of the anti-wear agent may range from about 1 wt % to about 3 wt %, based on the total amount of the second solution. If the amount of the anti-wear agent is less than about 1 wt %, the coating film may not have the sufficient wear resistance. If the amount of the anti-wear agent exceeds about 3 wt %, an adhesion of the coating film may be decreased.

2.6. Defoaming Agent

Bubbles or foams may be generated during processes including, for example, a stirring process, a dispersing process and a coating process of the polyurethane composition. The bubbles or foams may result in craters and/or surface defects of the dried coating film. Thus, the defoaming agent may be added in the second solution to prevent a generation of the bubbles or foams, or remove the generated bubbles or foams.

Materials containing molecules that have a low surface tension, e.g., silicon, a mineral oil, a fatty acid or fluorocarbon may be used as the defoaming agent. In one example embodiment, the defoaming agent may include a non-silicon based material.

In example embodiments, an amount of the defoaming agent may range from about 1 wt % to about 3 wt %, based on the total amount of the second solution. If the amount of the defoaming agent is less than about 1 wt %, the bubbles or foams of the coating film may not be sufficiently removed. If the amount of the defoaming agent exceeds about 3 wt %, a cratering phenomenon may occur during a formation of the coating film.

In one example embodiment, the second solution may further include the lubricant so that a fluidity of the polyurethane composition and a flatness of the coating film may be improved. A dispersibility of the nano-carbon may also be improved by the lubricant.

The lubricant may include a liquid state hydrocarbon. For example, the lubricant may include fatty acid derivatives such as a stearic acid ester, a fatty acid amide, a stearic acid amide, a fatty acid ester amide, a stearic acid amide alkyl stearate, etc.

For example, the lubricant may include methylene bis-lauramide, methylene bis-myristamide, methylene bis-palmitamide, methylene bis-stearamide, methylene bis-behenamide, methylene bis-oleamide, ethylene bis-lauramide, ethylene bis-myristamide, ethylene bis-palmitamide, ethylene bis-stearamide, ethylene bis-behenamide, ethylene bis-montanamide, ethylene bis-oleamide, etc.

In example embodiments, an amount of the lubricant may range from about 1 wt % to about 3 wt %, based on the total amount of the second solution. If the amount of the lubricant is less than about 1 wt %, the flatness of the coating film may be deteriorated. If the amount of the lubricant exceeds about 3 wt %, the fluidity of the polyurethane composition may be excessively increased.

In one example embodiment, the second solution may further include a catalyst to facilitate a curing or a hardening of the second solution or the polyurethane composition.

A bismuth-based catalyst, e.g., MB-20 (manufactured by AIR PRODUCT Co.) may be used as the catalyst.

In example embodiments, an amount of the catalyst may range from about 0.01 wt % to about 1 wt %, based on the total amount of the second solution. If the amount of the catalyst is less than about 0.01 wt %, a drying time for forming the coating layer may be increased, and properties of the coating layer including chemical resistance, moisture resistance and wear resistance may be reduced. If the amount of the catalyst exceeds about 1 wt %, the curing or the hardening of the polyurethane composition may be excessively accelerated to result in a popping or a shrinkage of the coating layer.

In example embodiments, the cavitation resistant polyurethane composition may be a two-liquid solvent-free type paint.

A volume ratio of the first solution and the second solution in the polyurethane composition may be about 1:1.

A mole ratio of the functional group of the isocyanate compound (NCO) in the urethane prepolymer and the functional group of the polyol (OH) in the second solution may be between about 1.0:1.0 to about 1.05:1.0.

The cavitation resistant polyurethane composition according to example embodiments may be coated on a metal pre-form. For example, the polyurethane composition may be coated on surfaces of a propeller or a rudder of a large vessel. In example embodiments, the polyurethane composition may be coated using a spray machine or a cartridge air gun. The coated polyurethane composition may be dried through a two-liquid reaction to form a coating film.

In the formation of the coating film, the polyurethane composition may be coated using the spray machine at a temperature of about 60° C. to about 70° C., and with a discharging pressure of about 200 bar to about 250 bar. Alternatively, the polyurethane composition may be coated using the cartridge air gun at a room temperature.

In one example embodiment, the coating layer may be formed to have a thickness ranging from about 0.5 millimeter (mm) to about 3 mm.

For example, the surfaces of the rudder or the propeller may be treated by a shot blast, and a solvent washing. An epoxy anti-corrosion two-liquid type undercoating composition may be coated on the surfaces and dried. An urethane undercoating composition may be further coated and dried, and then the polyurethane composition according to example embodiments may be coated using the spray machine or the cartridge air gun.

Hereinafter, detailed descriptions on preparation methods and effects of the cavitation resistant polyurethane composition will be provided with reference to Examples.

1. Preparation of First Solution 1.1. Preparation Example 1-1

About 38 wt % of PP-2000 (manufactured by KPX Chemicals Co., KR) as bi-functional polyether polyol having a weight average molecular weight of about 2,000 was put into a 3-neck round flask, and a moisture level was monitored using Karl Fischer moisture analyzer. When the moisture level reached below about 0.05%, a nitrogen gas was introduced. About 12 wt % of Cosmonate PH (manufactured by KUMHO MITSUI CHEMICALS Co., KR) as pure MDI and about 50 wt % of Cosmonate LL (manufactured by KUMHO MITSUI CHEMICALS Co., KR) as liquid MDI were added. The mixture was heated to about 60° C. and stirred about 3 hours. When an isocyanate functional group level measured by ASTM D-2572 reached about 16.5%, a reaction was terminated to obtain a urethane prepolymer.

1.2. Preparation Example 1-2

About 38 wt % of PCD-4672 (manufactured by Asahi KASEI Co., JP) as bi-functional polycarbonate polyol having a weight average molecular weight of about 2,000 was put into a 3-neck round flask, and a moisture level was monitored using Karl Fischer moisture analyzer. When the moisture level reached below about 0.05%, a nitrogen gas was introduced. About 12 wt % of Cosmonate PH (manufactured by KUMHO MITSUI CHEMICALS Co., KR) as pure MDI and about 50 wt % of Cosmonate LL (manufactured by KUMHO MITSUI CHEMICALS Co., KR) as liquid MDI were added. The mixture was heated to about 60° C. and stirred about 3 hours. When an isocyanate functional group level measured by ASTM D-2572 reached about 16.5%, a reaction was terminated to obtain a urethane prepolymer.

1.3. Preparation Example 1-3

About 38 wt % of Capa 2201 (manufactured by Perstorp Co., UK) as bi-functional polycaprolactone polyol having a weight average molecular weight of about 2,000 was put into a 3-neck round flask, and a moisture level was monitored using Karl Fischer moisture analyzer. When the moisture level reached below about 0.05%, a nitrogen gas was introduced. About 12 wt % of Cosmonate PH (manufactured by KUMHO MITSUI CHEMICALS Co., KR) as pure MDI and about 50 wt % of Cosmonate LL (manufactured by KUMHO MITSUI CHEMICALS Co., KR) as liquid MDI were added. The mixture was heated to about 60° C. and stirred about 3 hours. When an isocyanate functional group level measured by ASTM D-2572 reached about 16.5%, a reaction was terminated to obtain a urethane prepolymer.

1.4. Preparation Example 1-4

About 19 wt % of PCD-4672 (manufactured by Asahi KASEI Co., JP) as bi-functional polycarbonate polyol having a weight average molecular weight of about 2,000 and about 19 wt % of PP-2000 (manufactured by KPX Chemicals Co., KR) as bi-functional polyether polyol having a weight average molecular weight of about 2,000 were put into a 3-neck round flask, and a moisture level was monitored using Karl Fischer moisture analyzer. When the moisture level reached below about 0.05%, a nitrogen gas was introduced. About 12 wt % of Cosmonate PH (manufactured by KUMHO MITSUI CHEMICALS Co.) as pure MDI and about 50 wt % of Cosmonate LL (manufactured by KUMHO MITSUI CHEMICALS Co.) as liquid MDI were added. The mixture was heated to about 60° C. and stirred about 3 hours. When an isocyanate functional group level measured by ASTM D-2572 reached about 16.5%, a reaction was terminated to obtain a urethane prepolymer.

Compositions of Preparation Examples 1-1 to 1-4 are listed in Table 1 below.

TABLE 1

| First Solution | Preparation Example 1-1 | Preparation Example 1-2 | Preparation Example 1-3 | Preparation Example 1-4 |
|---|---|---|---|---|
| Cosmonate LL | 12 | 12 | 12 | 12 |
| Cosmonate PH | 50 | 50 | 50 | 50 |
| PP-2000 | 38 | | | 19 |
| PCD-4672 | | 38 | | 19 |
| Capa 2201 | | | 38 | |
| Total (wt %) | 100 | 100 | 100 | 100 |

2. Second Solution

Compositions of Preparation Examples 2-1 to 2-4 are listed in Table 2 below.

TABLE 2

| Second Solution | Preparation Example 2-1 | Preparation Example 2-2 | Preparation Example 2-3 | Preparation Example 2-4 |
|---|---|---|---|---|
| Capa 4101 [1] | 90 | 90 | 90 | 90 |
| BLUE 17A/B [2] | 2 | 2 | 2 | 2 |
| HC-100 [3] | 1 | 1 | 1 | 1 |
| AC-326F [4] | 2 | 2 | 2 | 2 |
| SA-1720 POWDER [5] | 1.7 | 1.7 | 1.7 | 1.7 |
| NP-C Carbon Nano Graphite [6] | 1 | | | |
| GNF-L Carbon Nano Graphite fiber [7] | | 1 | | 1 |
| Carbon Nano CNT M90 [8] | | | 1 | |
| BORONID S6 [9] | 2 | 2 | 2 | |
| PM 200 [10] | | | | 2 |
| MB-20 [11] | 0.3 | 0.3 | 0.3 | 0.3 |
| Total (wt %) | 100 | 100 | 100 | 100 |

[1] polyol, manufactured by PERSTORP Co., UK,
[2] colorant, manufactured by Milliken Co., US,
[3] lubricant, manufactured by MITSUI Chemicals Co., JP,
[4] defoaming agent, manufactured by Kyoeisha Co., JP,
[5] moisture absorbent, manufactured by CICA. Co., FR,
[6] nano-carbon, manufactured by MTI Co., US,
[7] nano-carbon, manufactured by Carbon Nanotech Co., KR,
[8] nano-carbon, manufactured by Carbon Nanotech Co., KR,
[9] anti-wear agent, manufactured by ESK Co., GE,
[10] anti-wear agent, manufactured by MITSUI Chemicals Co., JP,
[11] catalyst, manufactured by AIR PRODUCT Co., US.

Examples of Polyurethane Compositions

The first solutions of Preparation Examples 1-1 to 1-4 and the second solutions of Preparation Examples 2-1 to 2-4 were mixed with volume ratios as shown in Table 3.

| | Example 1 | Example 2 | Example 3 | Example 4 | Example 5 | Example 6 | Example 7 |
|---|---|---|---|---|---|---|---|
| Preparation Example 1-1 | 1 | | | | | | |
| Preparation Example 1-2 | | 1 | | | | | |
| Preparation Example 1-3 | | | 1 | | 1 | 1 | 1 |
| Preparation Example 1-4 | | | | 1 | | | |
| Preparation Example 2-1 | 1 | 1 | 1 | 1 | | | |
| Preparation Example 2-2 | | | | | 1 | | |
| Preparation Example 2-3 | | | | | | 1 | |
| Preparation Example 2-4 | | | | | | | 1 |
| Total | 2 | 2 | 2 | 2 | 2 | 2 | 2 |

Experimental Example

Evaluation on Properties of Coating Layers

Specimens of coating films were prepared using the polyurethane compositions of the above Examples 1 to 7 by a combination of a spray machine and a cartridge air gun. Tensile strengths, elongations, adhesions, wear resistances and cavitation resistances of Examples 1 to 7 were measured.

A specimen of a coating film of Comparative Example 1 was prepared using a conventional epoxy paint (Duratough DL, manufactured by Enecon Co., US) commonly used in a vessel. A tensile strength, an elongation, an adhesion, a wear resistance and a cavitation resistance of Comparative Example 1 was measured.

The tensile strength and the elongation were measured by a standard of KSM 6518 after keeping at a room temperature for 7 days. The adhesion, the wear resistance and the cavitation resistance were measured by methods of ASTM D-4541, ASTM D-4060 and Modified ASTM G32, respectively. The results are shown in Table 4 below.

|  | Tensile Strength (kg/cm$^2$) | Elongation (%) | Adhesion (Mpa) | Wear Resistance (mg) | Cavitation Resistance (CMDE t$_{50}$) |
|---|---|---|---|---|---|
| Example 1 | 94 | 150 | 9.8 | 4.5 | 172 |
| Example 2 | 145 | 150 | 10.9 | 9.5 | 332 |
| Example 3 | 101 | 135 | 10.4 | 3.4 | 186 |
| Example 4 | 120 | 140 | 10.5 | 5.0 | 170 |
| Example 5 | 130 | 180 | 11.5 | 4.7 | 292 |
| Example 6 | 137 | 165 | 12.0 | 4.7 | 209 |
| Example 7 | 140 | 155 | 8.5 | 5.8 | 220 |
| Comparative Example 1 | 119 | 75 | 9.3 | 5.9 | 113 |

In Table 4, "CMDE (Cumulative Mean Depth of Erosion) t50" represents a time required for an erosion thickness of 50 μm.

Referring to Table 4, the coating films of Examples 1 to 7 were shown to have greater cavitation resistances than that of the coating film of Comparative Example 1.

The coating films of Examples 1, 3 and 4 using graphite were shown to have less erosion times that of the coating films of Examples 5 to 7. It can be acknowledged that the coating film of Example 5 using a graphite fiber had a relatively large erosion time.

The coating film of Comparative Example 1 had a relatively high erosion rate, and cracks or destructions of a surface were observed.

As described above, a coating film formed from a polyurethane composition in accordance with example embodiments may have excellent mechanical and chemical properties including cavitation resistance, wear resistance, chemical resistance, adhesion, etc., and may be cost-efficient. Further, the polyurethane composition may be solvent-free and capable of being spray-coated, so that the coating layer may be formed easily and eco-friendly.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A cavitation resistant polyurethane composition, comprising:
    a first solution comprising a urethane prepolymer, the urethane prepolymer being synthesized by a polymerization of about 60 weight percent to about 70 weight percent of an isocyanate compound and about 30 weight percent to about 40 weight percent of a polyol, based on a total weight of the first solution, wherein an average number of functional groups per molecule of the isocyanate compound is at least 2; and
    a second solution comprising:
        about 90 weight percent to about 95 weight percent of polycaprolactone polyol having an average functional group number of 4;
        about 1 weight percent to about 3 weight percent of a nano-carbon including graphite fiber;
        about 1 weight percent to about 3 weight percent of a colorant;
        about 1 weight percent to about 3 weight percent of a moisture absorbent;
        about 1 weight percent to about 3 weight percent of an anti-wear agent; and
        about 1 weight percent to about 3 weight percent of a defoaming agent, based on a total weight of the second solution,
    wherein a volume ratio of the first solution and the second solution is about 1:1,
    wherein a mole ratio of a functional group of the isocyanate compound (NCO) and a functional group of the polyol (OH) in the second solution is between about 1.0:1.0 to about 1.05:1.0.

2. The composition of claim 1, wherein a weight average molecular weight of the urethane prepolymer is in a range of from about 2,000 to about 4,000.

3. The composition claim 1, wherein the isocyanate compound includes at least one selected from the group consisting of 1,6-hexamethylene diisocyanate (HDI), isophorone diisocynate (IPDI), 4,4'-dicyclohexamethylene diisocyanate (H12MDI) and methylene diphenyl isocyanate (MDI).

4. The composition of claim 1, wherein the polyol in the first solution includes at least one selected from the group consisting of polyoxyalkylene polyol, polytetramethylene polyol, polyether polyol, polyester polyol, polycarbonate polyol and polycaprolactone polyol.

5. The composition of claim 1, wherein the colorant includes at least one selected from the group consisting of carbon black, anthraquinone, phthalocyanine, benzimidazolone, iron oxide yellow, iron oxide red, manganese pyrophosphate, titanium dioxide (TiO2) and zinc oxide (ZnO).

6. The composition of claim 1, wherein the moisture absorbent includes at least one selected from the group consisting of polyether calcium oxide, zeolite and aluminum oxide.

7. The composition of claim 1, wherein the anti-wear agent includes at least one selected from the group consisting of boron nitride, polyethylene and molybdenum sulfate.

8. A method of forming a coating film, comprising:
    coating a polyurethane composition on a metal preform; and
    drying the polyurethane composition, wherein the polyurethane composition comprises:
a first solution comprising a urethane prepolymer, the urethane prepolymer being synthesized by a polymerization of about 60 weight percent to about 70 weight percent of an isocyanate compound and about 30 weight percent to about 40 weight percent of a polyol, based on a total weight of the first solution, wherein an average number of functional groups per molecule of the isocyanate compound is at least 2; and
a second solution comprising:
about 90 weight percent to about 95 weight percent of polycaprolactone polyol having an average functional group number of 4;
about 1 weight percent to about 3 weight percent of a nano-carbon including graphite fiber;
about 1 weight percent to about 3 weight percent of a colorant;
about 1 weight percent to about 3 weight percent of a moisture absorbent;
about 1 weight percent to about 3 weight percent of an anti-wear agent; and
about 1 weight percent to about 3 weight percent of a defoaming agent, based on a total weight of the second solution,
wherein a volume ratio of the first solution and the second solution is about 1:1,
wherein a mole ratio of a functional group of the isocyanate compound (NCO) and a functional group of the polyol (OH) in the second solution is between about 1.0:1.0 to about 1.05:1.0.

9. The method of claim 8, wherein the polyurethane composition is coated by a spray machine with a discharging pressure of about 200 bar to about 250 bar.

10. The method of claim 9, wherein the polyurethane composition is coated at a temperature of about 60° C. to about 70° C.

11. The method of claim 8, wherein the polyurethane composition is coated using a cartridge air gun at a room temperature.

12. The method of claim 7, wherein the coating film has a thickness ranging from about 0.5 mm to about 3 mm.

* * * * *